Figure 1:
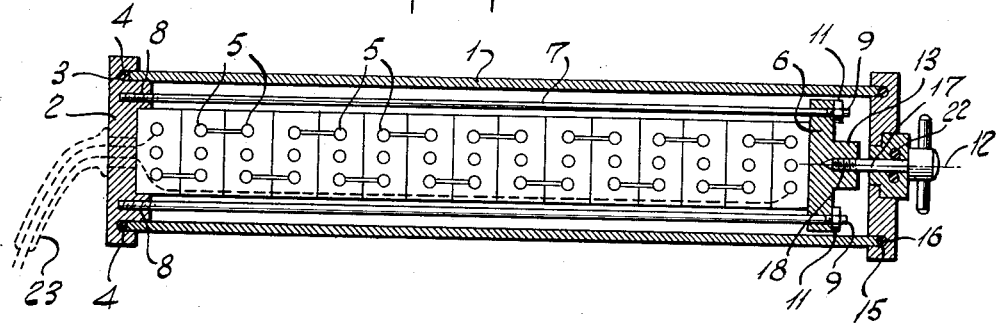

July 17, 1962  D. ISSAIEWITCH REBIKOFF  3,044,655
SUBMARINE CASING ADAPTED TO BE OPENED SPEEDILY
Filed July 10, 1957

INVENTOR.
DIMITRI ISSAIEWITCH REBIKOFF
BY Stanley Wolder
ATTORNEY

United States Patent Office 3,044,655
Patented July 17, 1962

3,044,655
SUBMARINE CASING ADAPTED TO BE
OPENED SPEEDILY
Dimitri Issaiewitch Rebikoff, Cannes, France, assignor to Loral Electronics Corporation, New York, N.Y., a corporation of New York
Filed July 10, 1957, Ser. No. 671,031
11 Claims. (Cl. 220—4)

It is a well known fact that it is possible to execute fluidtight casings to be used under water by securing a member forming a sealing cover over a casing body which is otherwise fluidtight.

The securing of each cover is performed through bolts or screws cooperating with winged nuts distributed along the periphery of the cover and the number of which is generally equal to four, five or six.

Applicant's prior French Patent 1,078,874 filed on June 17, 1953, has shown that it is possible to interengage the parts protected by the casing by securing them inside said casing to a plate forming the fluidtight cover of the body of the casing as mentioned hereinabove, the separation between said body and said plate providing for the free passage out of the casing body of all its contents which are thus removed together with the covering plate to which the various parts remain secured and which carries the various mechanical, pneumatic or electrical connections leading to the outside of the casing.

It is also known in the art to close the two ends of a hollow central section of the casing body by covers which are interconnected by threaded tie-rods on the outside of the body of the casing, which tie-rods are provided with nuts clamping the covers against the openings of the central section. It is also possible to resort to a known system of outer clamping stirrups associated with a single central threaded member, but such an arrangement remains bulky and subject to fouling.

Such prior arrangements which are perfectly suitable as concerns fluidtightness, positioning of the parts and easy access to the latter, require however a series of unscrewing and screwing operations each time it is desired to open and to close the casing.

The outer threads of these arrangements may be fouled or damaged and their use may require much time at each opening or closing of the casing.

In the case of submarine photographic or kinematographic operations, the opening and closing required for the change of films for instance should be as speedy as possible.

The improved arrangement forming the object of the present invention removes the above drawbacks and it is constituted by a conventional fluidtight casing chiefly for submarine apparatus, said casing including an outer shell or body assembled endwise with the interposition of a fluidtight packing with a plate carrying inside the body the group of parts to be protected and which are devoid of any connection with the actual body and may be removed out of the latter together with the plate upon withdrawal of said plate.

According to my invention, the assembly of said covering plate with the outer casing is obtained through the agency of a single rotary member which may be grasped from the outside of the casing and which extends revolubly into the latter through the end opposed to the opening closed by the covering plate; the fluidtightness of this passage is obtained through conventional means without any sliding at least while the casing is in its closed condition. Said rotary member is adapted to cooperate with a nut and screw system coaxial therewith of which one component is carried by the inner end of said rotary member, while the other component is connected rigidly with the plate through members extending inside the casing while they are devoid of any connection with the casing body, said members carrying the parts to be protected by the casing so that the screwing, controlled from the outside through rotation of said single rotary member, of the nut and screw system when in its position providing for the operative interconnection of the sections of the fluidtight casing drive and compress said sections against each other and through the operation of the various packings provide for the fluidtight assembly of the casing, the unscrewing obtained through said rotary member allowing an instantaneous dismantling leading to an easy access to the parts enclosed in the casing.

Figure 2:
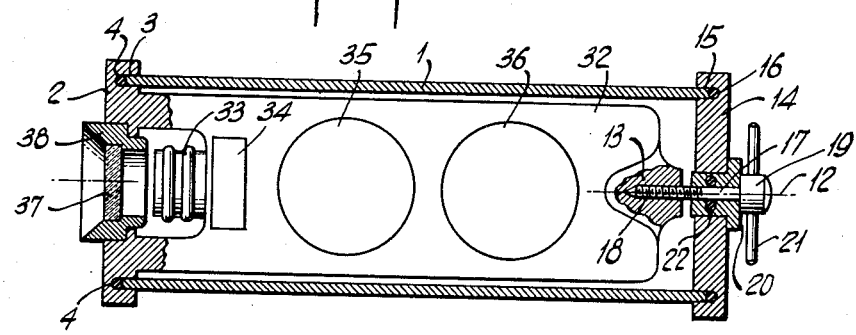

I have illustrated in the diagrammatic accompanying drawings two embodiments of a fluidtight casing according to my invention, said embodiments shown respectively in FIGS. 1 and 2, being disclosed by way of a mere exemplification and by no means in a binding sense.

In the two figures, the same reference numbers designate similar parts.

In FIG. 1, the casing body is constituted by a cylindrical tube 1 carrying at one end an end or cover plate 2 provided with a groove in its lateral surface for engagement by the terminal edge of the body 1 with the interposition of a tore-shaped packing 4 inserted in the groove 3.

To the rear of said plate 2 is arranged inside the tube 1 and out of contact with the latter a storage battery 5 or cargo secured as a unit to the plate 2 and to an intermediate cargo plate transverse section 6 through which pass threaded tie-rods 7 screwed at one end 8 into the plate 2 while their other ends 9 after passage through the transverse section 6 are engaged by nuts 11 which secure the storage battery rigidly to the plate 2, said plates, tie rods and fastening means comprising a cargo element.

Along the axis 12 of the cylindrical body 1, the transverse section 6 carries a tapped projection forming a stationary nut 13.

The end of the casing opposed to the covering plate is closed by another end plate or bottom section 14 engaging the corresponding terminal edge of tube 1 inside a groove 15 in which is fitted a packing 16. Said bottom section 14 is provided with an opening engaged by the rotary member 17 coaxial with tube 1 when positioned therein, said rotary member 17 being provided with a threaded extension 18 screwed inside the stationary nut 13. When said threaded section is screwed home inside said nut, the rotary member 17 engages the bottom section 14 through its outer larger diameter section 19 which bears against the flat central outer surface 20 of the bottom section and this produces a drawing together of the tie-rods 7 and consequently an urging of the bottom section 14 against the cylindrical body 1, the packing 16 being crushed in the groove 15 and the cylindrical body 1 compressing the packing 4 in the groove 3 of the covering plate 2.

The medial cylindrical section of the rotary member 17 has a smooth outer surface and passes through a tore-shaped sealing packing 22 housed inside a groove extending round a short section of the passage provided in the plate 14 for the rotary member. It is also possible to inert a flat bottom insert adapted to be crushed by the outer larger section 19 of the rotary member inside the flat surface 20 of the remainder of the bottom section 14. Fluidtightness is thus obtained round the rotary member 17 through conventional fully efficient means.

It is thus possible through the mere screwing of the rotary member 17 to obtain a speedy fluidtight assembling and closing of the casing including the body 1 and the terminal plates 2 and 14. This screwing is made easier as a matter of fact by the outer transverse handle 21 which may be readily grasped by the operator's hand.

The mere unscrewing of the rotary member 17 allows separating the bottom and instantaneously drawing the system 5—6—7 secured to the plate 2 out of the casing body 1.

The plate 2 serves for carrying in a conventional manner the passage fittings for instance those carrying the wires feeding the current from the battery which wires are illustrated in interrupted lines at 23 so that the removal of the storage battery may be performed without any further operation.

A second example of a casing according to my invention is illustrated diagrammatically in FIG. 2 illustrating a casing enclosing a submarine kinematographic camera in which the securing means operating through mere screwing make the change of film spools a very speedy matter.

Apart from the members described hereinabove with reference to FIG. 1 and the reference numbers of which have been retained so that their description need not be repeated, the differences consist merely in that the nut 13 engaging the threaded member 18 is secured in the terminal boss of a partition rigid with the plate 2 and to which are secured the objective 33, the control mechanism 34 of the camera and the film feed and take up spools 35 and 36. The objective is inserted along the axis of the fluidtight fitting 38 carrying the optic porthole which is secured to the plate 2 and passes through the latter.

The operation is similar to that disclosed hereinabove with reference to FIG. 1 and it need not be described again since it will be readily understood from the preceding description and examination of FIG. 2.

The unscrewing of the rotary member 17 by rotation of handle 21 allows removing instantaneously the parts contained inside the camera out of the casing which protects them and which is held in its assembled fluidtight condition through the mere speedy screwing of the rotary member and of its threaded extension 18 into the nut 13 as provided by the rotation of the handle 21 after the closing obtained through the application of the terminal plates 2 and 14.

Obviously the shape of the bottom section 14, of the plate 2 and of the body 1 are irrelevant and their design is governed by the mere necessity of a ready accessibility to the inner mechanism of the camera.

The tube 1 may be closed at one end by an integral end wall which replaces the removable bottom section 14.

The tube 1 may also be made of a plurality of annular sections with the interposition of suitable packings, said annular sections being urged against one another through the screwing home of the single rotary member, in accordance with the gist of the invention as defined in the accompanying claims.

What I claim is:

1. A fluidtight casing comprising a hollow body having an opening, a removable cover fluidtightly bearing against the outer borders of said opening, a rigid cargo element housed within said body and rigidly secured to said cover, a rotatable member extending through the wall of the body opposite said opening therein, the inner end of said member and the part of said element confronting said member being provided with mating threaded portions, said portions being threadedly engaged, and detent means carried by said member and bearing against said body to prevent inward displacement relative said body of said member along its axis of rotation.

2. A fluidtight casing comprising a hollow body having an opening, a removable cover fluidtightly bearing against the outer borders of said opening, a cargo element including a cargo plate spaced from said cover, a plurality of elongated rods connected to and extending from said cover to said plate, free of contact with said body, a rotatable member extending through the wall of the body opposite said opening therein, the inner end of said member and the part of said plate confronting said member being provided with mating threaded portions, said portions being threadedly engaged, and detent means carried by said members and bearing against said body to prevent inward displacement relative said body of said member along its axis of rotation.

3. A casing as described in claim 2, the connection between said rods and at least one of said cover and plate being variable along the length of said rods whereby the distance between said cover and plate may be variable.

4. A fluidtight casing comprising a hollow body having an opening, a removable cover fluidtightly bearing against the outer borders of said opening, a cargo element including a rigid housing for an article of manufacture housed within said body and rigidly secured to said cover free of contact with said body, a rotatable member extending through the wall of the body opposite said opening therein, the inner end of said member and the part of said housing confronting said member being provided with mating threaded portions, said portions being threadedly engaged, and detent means carried by said member and bearing against said body to prevent inward displacement relative said body of said member along its axis of rotation.

5. A fluidtight casing comprising a rigid elongated tubular body, having longitudinally oppositely disposed openings, removable cover and bottom plates fluidtightly bearing against the outer borders of said openings, a rigid cargo element housed within said body and rigidly secured to said cover plate, a rotatable member extending through said bottom plate, the inner end of said member and the part of said element confronting said member being provided with mating threaded portions, said portions being threadedly engaged, and detent means carried by said member and bearing against bottom plate to prevent inward displacement relative said bottom plate of said body along its axis of rotation.

6. A casing as described in claim 5, each of said plates having a circular groove formed in its inside face dimensioned to admit an end of said body, a packing material positioned in and continuously along each of said grooves.

7. A fluidtight casing comprising a rigid elongated tubular body, having longitudinally oppositely disposed openings, removable cover and bottom plates fluidtightly bearing against the outer borders of said openings, a cargo element including a cargo plate spaced from said cover plate, a plurality of elongated rods extending from said cover plate and connected to said bottom plate, a rotatable member extending through said bottom plate, the inner end of said member and the part of said bottom plate confronting said member being provided with mating threaded portions, said portions being threadedly engaged, and detent means carried by said member and bearing against bottom plate to prevent inward displacement relative said bottom plate of said body along its axis of rotation.

8. A casing as described in claim 7, the connection between said rods and at least one of said plates being variable along the length of said rods.

9. A fluidtight casing comprising a rigid elongated tubular body, having longitudinally oppositely disposed openings, removable cover and bottom plates fluidtightly bearing against the outer borders of said openings, a cargo element including a rigid housing for an article of manufacture, a rotatable member extending through said bottom plate, the inner end of said member and the part of said housing confronting said member being provided with mating threaded portions, said portions being threadedly engaged, and detent means carried by said member and bearing against bottom plate to prevent inward displacement relative said bottom plate of said body along its axis of rotation.

10. A fluidtight casing comprising a rigid elongated tubular body, having longitudinally oppositely disposed openings, removable cover and bottom plates bearing against the outer borders of said openings, a rigid cargo element housed within said body and rigidly secured to said cover plate free of contact with said body, a rotatable member extending through said bottom plate including an inwardly extending stem, the innermost portion of which is provided with threads and a handle connected to said stem and extending normally thereof, said stem having an enlarged section bearing on an outwardly faced surface of said bottom plate to prevent inward displacement of said member relative said bottom plate, the portion of said element confronting said bottom plate being apertured and threaded to threadingly engage the threaded portion of said stem, whereby upon engagement of said threaded portions and rotation of said member, said plates are tightly drawn against the ends of said body in fluid-tight contact.

11. A casing as described in claim 10 each of said plates having a circular groove formed in its inside face dimensioned to admit an end of said body, a packing material positioned in and continuously along each of said grooves.

References Cited in the file of this patent

UNITED STATES PATENTS

| 81,713 | Wailey | Sept. 1, 1868 |
| 179,300 | Griscom | June 27, 1876 |
| 1,705,105 | Armistead | Mar. 12, 1929 |
| 2,495,552 | Schmitz | Jan. 24, 1950 |
| 2,828,857 | MacKay | Apr. 1, 1958 |